(12) United States Patent
Oba et al.

(10) Patent No.: US 8,583,923 B2
(45) Date of Patent: Nov. 12, 2013

(54) EAP METHOD FOR EAP EXTENSION (EAP-EXT)

(75) Inventors: Yoshihiro Oba, Englewood Cliffs, NJ (US); Subir Das, Kendall Park, NJ (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 1344 days.

(21) Appl. No.: 11/867,659

(22) Filed: Oct. 4, 2007

(65) Prior Publication Data

US 2008/0141031 A1   Jun. 12, 2008

Related U.S. Application Data

(60) Provisional application No. 60/869,113, filed on Dec. 8, 2006.

(51) Int. Cl.
*H04L 29/06*  (2006.01)

(52) U.S. Cl.
USPC ............................................. 713/168

(58) Field of Classification Search
USPC ............................................. 713/168
See application file for complete search history.

(56) References Cited

U.S. PATENT DOCUMENTS

| 7,529,933 B2 * | 5/2009 | Palekar et al. ................ 713/168 |
| 2003/0226017 A1 | 12/2003 | Palekar et al. |
| 2004/0010713 A1 | 1/2004 | Vollbrecht et al. |
| 2005/0120213 A1 * | 6/2005 | Winget et al. ................. 713/171 |
| 2009/0019284 A1 * | 1/2009 | Cho et al. ..................... 713/170 |

OTHER PUBLICATIONS

S. Bradner, Key Words for Use in RFC's to Indicate Requirement Levels, Mar. 1997, p. 1-4, Network Working Group, USA.
B. Aboba, Extensible Authentication Protocol, Jun. 2004, p. 1-70, The Internet Society, USA.
B. Aboba, Extensible Authentication Protocol Key Management Framework, Nov. 11, 2007, p. 1-73, Internet Draft, USA.
V. Narayanan, Problem Statement on EAP Efficient Re-Authentication and Key Management, Oct. 15, 2006, p. 1-11, Internet Draft, USA.
Y. Ohba, Channel Binding Mechanism Based on Parameter Binding in Key Derivation, Dec. 3, 2006, p. 1-18, Internet Draft, USA.
J. Salowey, Specification for the Derivation of Usage Specific Root Keys from an Extended Master Session Key, Jun. 19, 2006, p. 1-16, Internet Draft, USA.
Secure Hash Standard, May 11, 1993, p. 1-17, FIPS PUB 180-1, USA.
J. Arkko, Authenticated Service Information for the Extensible Authentication Protocol, Oct. 24, 2005, p. 1-26, Internet Draft, USA.
C. Kaufman, Internet Key Exchange Protocol, Dec. 2005, p. 1-98, The Internet Society, USA.
V. Narayanan, EAP Extensions for EAP Re-authentication Protocol, Feb. 19, 2008, p. 1-39, Internet Draft, USA.
J Salowey, Specification for the Derivation of Root Keys from an Extended Master Session Key, Apr. 22, 2008, p. 1-19, Internet Draft, USA.

(Continued)

*Primary Examiner* — Joseph P. Hirl
*Assistant Examiner* — John B King
(74) *Attorney, Agent, or Firm* — Westerman, Hattori, Daniels & Adrian, LLP

(57) ABSTRACT

This document describes an EAP method used for extending EAP functionality. The extended functionality includes channel binding and re-authentication. The EAP method also allows sequencing of multiple EAP methods inside it.

21 Claims, 7 Drawing Sheets

(56) References Cited

OTHER PUBLICATIONS

Aboba et al. "PPP EAP TLS Authentication Protocol", Internet Engineering Task Force (IETF), Oct. 1999, p. 1-23, The Internet Society, USA.
Aboba et al. "Extensible Authentication Protocol (EAP)", Internet Engineering Task Force (IETF), Jun. 2004, p. 1-66, The Internet Society, USA.
European Search Report dated Dec. 20, 2010, issued in corresponding European Patent Application No. 07 850 452.9.
Extended European Search Report dated Apr. 15, 2013, issued in corresponding European Patent Application No. 12171641.9.
Chinese Office Action dated Jun. 5, 2012, issued in corresponding Chinese Patent Application No. 200780004901.6, (15 pages). W/ English Translation.
Chinese Office Action dated May 18, 2011, issue in corresponding Chinese Patent Application No. 200780004901.6.
Chinese Office Action dated Jan. 22, 2013, issued in corresponding Chinese Patent Application No. 200780004901.6, w/ English translation.
European Office Action dated Dec. 13, 2011, issued in corresponding European Patent Application No. 07850452.9.
Ohba Y et al., "An EAP Method of EAP Extension (EAP-EXT); draft-ohba-hokey-emu-eap-ext-00.txt", IETF, Jan. 4, 2007, XP015050280.(cited in European Office Action dated Dec. 13, 2011).
Japanese Office Action dated Oct. 18, 2011, issued in corresponding Japanese Patent Application No. 2009-509206.
Matsumoto et al.; "Distributed object access control by categorization of services and clients"; Multimedia communication and distributed processing workshop, Information Processing Society of Japan, Oct. 23, 2002, vol. 2002, No. 15, p. 129-134.(cited in Japanese Office Action dated Oct. 18, 2011)(w/partial English translation).
Stanley et al.; "Extensible Authentication Protocol (EAP) Method Requirements for Wireless LANs"; Network Working Group Request for Comments:74017, [online], Mar. 2005, Category: Informational, [retrieved on Oct. 4, 2011], Retrieved from the Internet, URL, <http://tools.Ietf.Org/html/rfc4017>.(cited in Japanese Office Action dated Oct. 18, 2011)(w/partial English translation).
Japanese Office Action dated Jul. 9, 2013, issued in Japanese Patent Application No. 2012-095152, w/English translation.

* cited by examiner

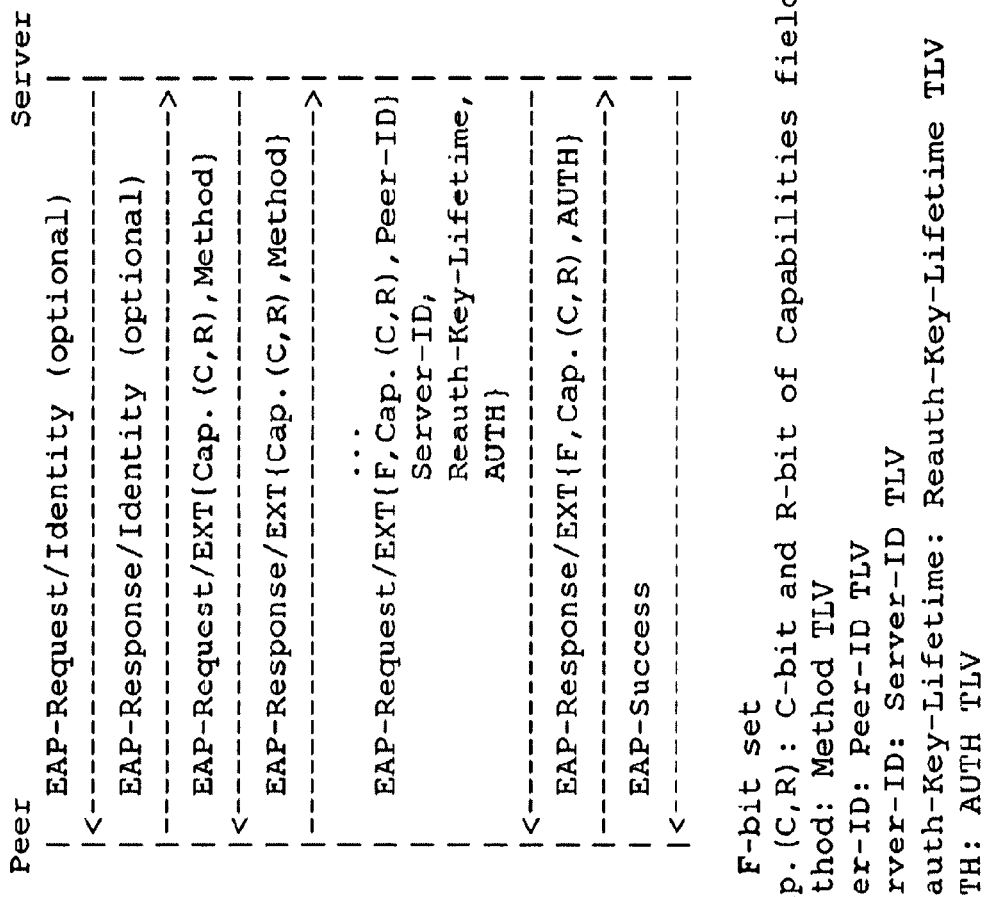

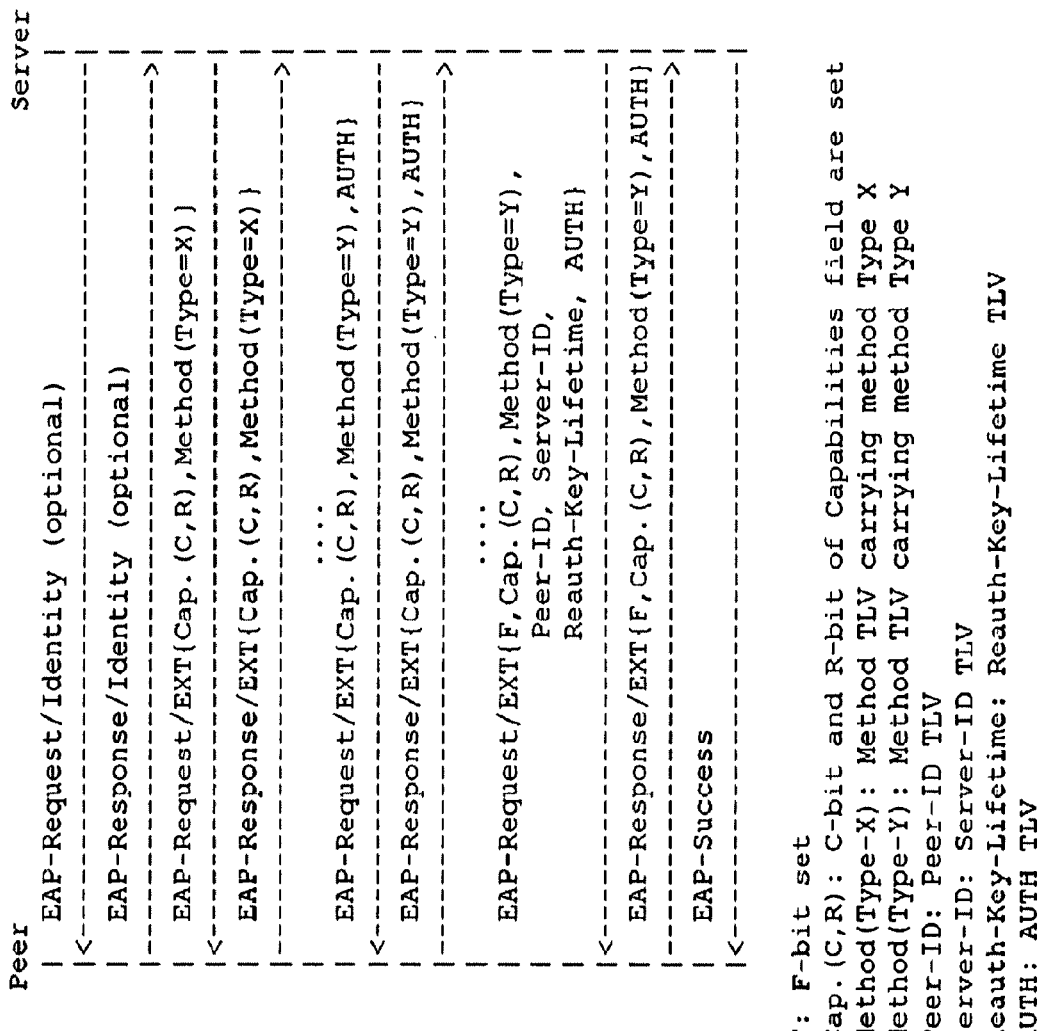
Figure 2: EAP-EXT message sequence with multiple inner methods

FIG. 4

```
Peer                                                                    Server
 |   EAP-Request/Identity (optional)                                       |
 |<-----------------------------------------------------------------------|
 |   EAP-Response/Identity (optional)                                      |
 |----------------------------------------------------------------------->|
 |   EAP-Request/EXT{Cap.(R,C),PRF(1,2),Method(Type X),                    |
 |                  CBM(1,2),CBD,IAL(x)}                                   |
 |<-----------------------------------------------------------------------|
 |   EAP-Response/EXT{Cap.(R,C),PRF(1),Method(Type X),                     |
 |                   CBM(1)}                                               |
 |----------------------------------------------------------------------->|
 |                               ...                                       |
 |   EAP-Request/EXT{F,Cap.(R,C),PRF(1,2),Enc(Peer-ID,                     |
 |                   Server-ID,Reauth-Key-Lifetime),                       |
 |                   CBM(1,2),CBD,IAL(x),AUTH}                             |
 |<-----------------------------------------------------------------------|
 |   EAP-Response/EXT{F,Cap.(R,C),PRF(1),CBM(1),                           |
 |                   AUTH}                                                 |
 |----------------------------------------------------------------------->|
 |   EAP-Success                                                           |
 |<-----------------------------------------------------------------------|
```

F: F-bit is set
Cap.(R,C): R-bit and C-bit of Capabilities field are set
PRF(1,2): PRF TLV carrying PRF numbers 1 and 2
PRF(1):   PRF TLV carrying PRF numbers 1
Method(Type X): Method TLV carrying method Type X
Peer-ID: Peer-ID TLV
Server-ID: Server-ID TLV
Reauth-Key-Lifetime: Reauth-Key-Lifetime TLV
AUTH: AUTH TLV
CBM(1,2): Channel-Binding-Mechanism TLV with
          channel binding mechanism numbers 1 and 2
CBM(1):   Channel-Binding-Mechanism TLV with
          channel binding mechanism number 1
CBD: Channel-Binding-Data TLV
IAL(x): Integrity-Algorithm TLV with algorithm x.
Enc(...): Encrypted TLV

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Type=Encr-Algorithm TLV  |             Length            |
+-+-+-+-+-+-+-+-+-+-+-+-+-+-+-+-+-+-+-+-+-+-+-+-+-+-+-+-+-+-+-+-+
|                  Encryption Algorithms ...                    |
+-+-+-+-+-+-+-+-+-+-+-+-+-+-+-+-+-+-+-+-+-+-+-+-+-+-+-+-+-+-+-+-+
```

FIG. 7(A)

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Type=Intgr-Algorithm TLV |            Length=1           |
+-+-+-+-+-+-+-+-+-+-+-+-+-+-+-+-+-+-+-+-+-+-+-+-+-+-+-+-+-+-+-+-+
|Intgr.Algorithm|
+-+-+-+-+-+-+-+-+
```

FIG. 7(B)

EAP METHOD FOR EAP EXTENSION (EAP-EXT)

The present application claims priority under 35 U.S.C. 119 to prior U.S. provisional application Ser. No. 60/869,113, filed on Dec. 8, 2006, to Y. Oba, et al., entitled AN EAP METHOD FOR EAP EXTENSION (EAP-EXT), the entire disclosure of which is incorporated herein by reference as though recited herein in full.

BACKGROUND

1. Field of the Invention

The present application relates to wireless networking and, in some preferred embodiments, to systems and methods for . . . .

2. General Background Discussion

Networks and Internet Protocol:

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that is its own unique identifier.

IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OS (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host In the OSI and other similar models, IP is in Layer-S, the network layer.

Wireless Networks:

Wireless networks can incorporate a variety of types of mobile devices, such as: e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions), an antenna; a processor, one or more audio transducers (for example, a speaker or a microphone as in devices for audio communications), electromagnetic data storage (such as, e.g., ROM, RAM, digital data storage, etc., such as in devices where data processing is provided), memory, flash memory, a full chip set or integrated circuit; interfaces (such as, e.g., USB, CODEC, UART, PCM, etc.)- and/or the like.

Wireless LANs (WLANS) in which a mobile user can connect to a local area network (LAN) through a wireless connection may be employed for wireless communications. Wireless communications can include, e.g. communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver, an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (M IDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.50 cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (i.e. outside mobile IP), typically, routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level: routers can look at: e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

Media-Independent Pre-Authentication:

Media-independent Pre-Authentication (MPA) is a mobile-assisted, secure handover optimization scheme that works over any link-layer and with any mobility management protocol. With MPA, a mobile node is not only able to securely obtain an IP address and other configuration parameters for a Candidate Target Network (CTN), but is also able to send and receive IP packets using the obtained IP address before it actually attaches to the CTN. This makes it possible for the mobile node to complete the binding update of any mobility management protocol and use the new Care of Address (CoA) before performing a handover at link-layer.

MPA works over any link-layer and with any mobility management protocol including Mobile IPv4, Mobile IPv6, MOBIKE, HIP, SIP mobility, etc. In MPA, the notion of IEEE 802.111 pre-authentication is extended to work at a higher layer, incorporating additional mechanisms to perform early acquisition of IP address from a network from which the mobile terminal may move, as well as pro-active handover to the network while the mobile terminal is still attached to the current network.

A Mobile Node (MN) supporting MPA, starts a pre-authentication process with an Authentication Agent (AA). A successful authentication enables the PANA authentication agent (PAA) to establish security associations with the AA. This is in addition to a Configuration Agent (CA) used for securely executing a configuration protocol to securely deliver an IP address and other configuration parameters to the mobile nodes, and an Access Router (AR) securely executing a tunnel management protocol to establish a pro-active handover tunnel to the mobile node. This entire process is carried out when MN is connected to a current point of attachment. It is explained in detail in "draft-hba-mobopts-mpa-framework-02.txt", March 2006, and "draft-ohba-mobopts-mpa-framework-03.txt", Oct. 22, 2006, the disclosures of which are incorporated herein by reference.

Providing secure network access service requires access control based on the authentication and authorization of the clients and the access networks. Client-to-network authentication provides parameters that are needed to police the traffic flow through the enforcement points. A protocol is needed to carry authentication methods between the client and the access network.

PANA provides a link-layer agnostic transport for network access authentication methods. The Extensible Authentication Protocol (EAP) [discussed further below] provides such authentication methods. In this regard, PANA carries EAP which can carry various authentication methods. By the virtue of enabling transport of EAP above IP, any authentication method that can be carried as an EAP method is made available to PANA and hence to any link-layer technology.

The PANA protocol [I-D.ietf-pana-pana] carries EAP messages between a PaC (PANA Client) and a PAA (PANA Authentication Agent) in the access network. If the PaC is a mobile device and is capable of moving one access network to another while running its applications, it is critical for the PaC to perform a handover seamlessly without degrading the performance of the applications during the handover period. When the handover requires the PaC to establish a PANA session with the PAA in the new access network, the signaling to establish the PANA session should be completed as fast as possible.

The PANA protocol is run between a client (PaC) and a server (PAM) in order to perform authentication and authorization for the network access service. The protocol messaging involves of a series of request and responses, some of which may be initiated by either end. Each message can carry zero or more AVPs within the payload. The main payload of PANA is EAP which performs authentication. PANA helps the PaC and PAA establish an EAP session.

For further background information see Protocol for Carrying Authentication for Network Access (PANA), Internet Draft of the PANA Working Group of the I.E.T.F., document no. draft-ietf-pana-pana-12, dated Aug. 24, 2006, to D. Forsberg, Y. Ohba, et al., the entire disclosure of which is incorporated herein by reference as though recited herein in full.

EAP:

Referring to reference to Aboba, RFC 3748 (cited hereinbelow), illustrative aspects of Extensible Authentication Protocol (EAP) is set forth. EAP is an authentication framework which supports multiple authentication methods. EAP typically runs directly over data link layers such as Point-to-Point Protocol (PPP) or IEEE 802, without requiring IP. EAP provides its own support for duplicate elimination and retransmission: but is reliant on lower layer ordering guarantees. Fragmentation is not supported within EAP itself, however, individual EAP methods may support this.

EAP may be used on dedicated links, as well as switched circuits, and wired as well as wireless links. To date, EAP has been implemented with hosts and routers that connect via switched circuits or dial-up times using PPP [RFC1661]. It has also been implemented with switches and access points using IEEE 802 [IEEE-802]. EAP encapsulation on IEEE 802 wired media is described in [IEEE-802.1X], and encapsulation on IEEE wireless LANs in [IEEE-802.11].

One of the advantages of the EAP architecture is its flexibility. EAP is used to select a specific authentication mechanism, typically after the authenticator requests more information in order to determine the specific authentication method to be used. Rather than requiring the authenticator to be updated to support each new authentication method, EAP permits the use of a backend authentication server, which may implement some or all authentication methods, with the authenticator acting as a pass-through for some or all methods and peers.

Within this latter cited document, authenticator requirements apply regardless of whether the authenticator is operating as a pass-through or not. Where the requirement is meant to apply to either the authenticator or backend authentication server, depending on where the EAP authentication is terminated, the term "EAP server" has been used.

EAP was designed for use in network access authentication, where IP layer connectivity may not be available. EAP is a lock-step protocol which only supports a single packet in flight. As a result, EAP cannot efficiently transport bulk data, unlike transport protocols such as TCP or SCTP.

While EAP provides support for retransmission, it assumes ordering guarantees provided by the lower layer, so out of order reception is not supported. Since EAP does not support fragmentation and reassembly, EAP authentication methods generating payloads larger than the minimum EAP MTU need to provide fragmentation support.

While authentication methods such as EAP-TLS provide support for fragmentation and reassembly, the EAP methods defined in this latter cited document do not. As a result, if the EAP packet size exceeds the EAP MTU of the link, these methods will encounter difficulties.

EAP authentication is initiated by the server (authenticator), whereas many authentication protocols are initiated by the client (peer). As a result, it may be necessary for an authentication algorithm to add one or two additional messages (at most one roundtrip) in order to run over EAP.

Where certificate-based authentication is supported, the number of additional roundtrips may be much larger due to fragmentation of certificate chains. In general, a fragmented EAP packet will require as many round-trips to send as there are fragments. For example, a certificate chain 14960 octets in size would require ten round-trips to send with a 1496 octet EAP MTU. Where EAP runs over a lower layer in which significant packet loss is experienced, or where the connection between the authenticator and authentication server experiences significant packet loss, EAP methods requiring many roundtrips can experience difficulties. In these situations, use of EAP methods with fewer roundtrips is advisable.

The EAP authentication exchange proceeds as follows:

[1] The authenticator sends a Request to authenticate the peer. The Request has a Type field to indicate what is being requested. Examples of Request Types include Identity, MD5-challenge, etc. The MD5-challenge Type corresponds closely to the CHAP authentication protocol [see: RFC 1994]. Typically, the authenticator will send an initial Identity Request; however, an initial Identity Request is not required, and can be bypassed. For example, the identity may not be required where it is determined by the port to which the peer has connected (leased lines, dedicated switch or dial-up ports), or where the identity is obtained in another fashion (via calling station identity or MAC address, in the Name field of the MD5-Challenge Response, etc.).

[2] The peer sends a Response packet in reply to a valid Request. As with the Request packet, the Response packet contains a Type field, which corresponds to the Type field of the Request.

[3] The authenticator sends an additional Request packet, and the peer replies with a Response. The sequence of Requests and Responses continues as long as needed. EAP is a 'lock step' protocol, so that other than the initial Request, a new Request cannot be sent prior to receiving a valid Response. The authenticator is responsible for retransmitting requests. After a suitable number of retransmissions, the authenticator should end the EAP conversation. The authenticator needs to not send a Success or Failure packet when retransmitting or when it fails to get a response from the peer.

[4] The conversation continues until the authenticator cannot authenticate the peer (unacceptable Responses to one or more Requests), in which case the authenticator implementation needs to transmit an EAP Failure (Code 4). Alternatively, the authentication conversation can continue until the authenticator determines that successful authentication has occurred, in which case the authenticator needs to transmit an EAP Success (Code 3). Id.

Among other advantages, the EAP protocol can support multiple authentication mechanisms without having to pre-negotiate a particular one. In addition, Network Access Server (NAS) devices (e.g., a switch or access point) do not have to understand each authentication method and may act as a pass-through agent for a backend authentication server. Support for pass-through is optional. An authenticator may authenticate local peers, while at the same time acting as a pass-through for non-local peers and authentication methods it does not implement locally. Additionally, separation of the authenticator from the backend authentication server simplifies credentials management and policy decision making.

Conceptually, EAP implementations consist of the following components,

[a] Lower layer. The lower layer is responsible for transmitting and receiving EAR frames between the peer and authenticator. EAP has been run over a variety of lower layers including PPP, wired IEEE 802 LANs [see: IEEE802.1X], IEEE 802.11 wireless LANs [IEEE-802.11], UDP (L2TP [RFC2661] and IKEv2), and TCP.

[b] EAP layer. The EAP layer receives and transmits EAP packets via the lower layer, implements duplicate detection and retransmission, and delivers and receives EAP messages to and from the EAP peer and authenticator layers.

[c] EAP peer and authenticator layers. Based on the Code field, the EAP layer de-multiplexes incoming EAP packets to the EAR peer and authenticator layers. Typically, an EAP implementation on a given host will support either peer or authenticator functionality, but it is possible for a host to act as both an EAP peer and authenticator. In such an implementation both EAP peer and authenticator layers will be present.

[d] EAP method layers. EAP methods implement the authentication algorithms and receive and transmit EAP messages via the EAP peer and authenticator layers. Since fragmentation support is not provided by EAP itself this is the responsibility of EAP methods. Id.

The later cited reference sets forth the following definitions, which are cited herein for reference.

Authenticator:

The end of the link initiating EAP authentication. The term authenticator is used in [IEEE-802.1X], and has a similar meaning in this document.

Peer:

The end of the link that responds to the authenticator. In [IEEE-802.1X], this end is known as the Supplicant.

Backend Authentication Server:

A backend authentication server is an entity that provides an authentication service to an authenticator. When used, this server typically executes EAP methods for the authenticator. This terminology is also used in [IEEE-802.1X].

AAA:

Authentication, Authorization, and Accounting (AAA) protocols with EAP support include RADIUS and Diameter. In this document, the terms "AAA server" and "backend authentication server" are used interchangeably.

EAP server or Server:

The entity that terminates the EAP authentication method with the peer. In the case where no backend authentication server is used, the EAP server is part of the authenticator. In the case where the authenticator operates in passthrough mode, the EAP server is located on the backend authentication server.

Successful Authentication:

In the context of this document, "successful authentication" is an exchange of EAP messages, as a result of which the authenticator decides to allow access by the peer, and the peer decides to use this access. The authenticator's decision typically involves both authentication and authorization aspects; the peer may successfully authenticate to the authenticator, but access may be denied by the authenticator due to policy reasons.

Master Session Key (MSK):

Keying material that is derived between the EAP peer and server and exported by the EAP method. The MSK is at least 64 octets in length. In existing implementations, a MA server acting as an EAP server transports the MSK to the authenticator.

Extended Master Session Key (EMSK):

Additional keying material derived between the EAP client and server that is exported by the EAP method. The EMSK is at least 64 octets in length. The EMSK is not shared with the authenticator or any other third party. The EMSK is reserved for future uses that are not defined yet.

EAP Extension:

For reference, we refer to EAP Extensions for EAP Reauthentication Protocol (ERP), IETF Internet Draft, Aug. 24, 2007, of V. Narayanan, et al., seen at http://www.ietf.org/internet-drafts/draft-ietf-hokey-erx-04.txt. The reference explains EAP Extensions for EAP Reauthentication Protocol as follows. "The extensible authentication protocol (EAP) is a generic framework for transport of methods that authenticate two parties; the authentication is either one-way or mutual. The primary purpose is network access control, and a key generating method is recommended to enforce access control. The EAP keying hierarchy defines two keys that are derived at the top level—the master session key (MSK) and the extended MSK (EMSK). In the most common deployment scenario, a peer and a server authenticate each other through a third party known as the authenticator. The authenticator or an entity controlled by the authenticator enforces access control. After successful authentication, the server transports the MSK to the authenticator; the authenticator and the peer derive transient session keys (TSK) using the MSK as the authentication key or a key derivation key and use the TSK for per-packet access enforcement." Id. "When a peer moves from one authenticator to another, it is desirable to avoid full EAP authentication. The full EAP exchange with another run of the EAP method takes several round trips and significant time to complete, causing delays in handoff times. Some EAP methods specify the use of state from the initial authentication to optimize Re-authentications by reducing the computational overhead, but method-specific Re-authentication takes at least 2 roundtrips in most cases. It is also important to note that many methods do not offer support for Re-authentication. Thus, it is beneficial to have efficient Re-authentication support in LAP rather than in individual methods." Id. "Key sharing across authenticators is sometimes used as a practical solution to lower handoff times. In that case, compromise of an authenticator results in compromise of EAP sessions established via other authenticators." Id. "In conclusion, there is a need to design an efficient EAP Re-authentication mechanism that allows a fresh key to be established between the peer and an authenticator without having to execute the EAP method again." Id. "This document specifies EAP Reauthentication Extensions (ERX) for efficient re-authentication using EAP. The EAP Reauthentication Protocol (ERP) based on ERX supports EAP method independent Re-authentication for a peer that has valid, unexpired key material from a previously performed EAP authentication. The protocol and the key hierarchy required for EAP Reauthentication is described in this document." Id.

REFERENCES

The following background references are incorporated herein by reference in their entireties.

1. Bradner, S., "Key words for use in RFCs to Indicate Requirement Levels". BCP 14, RFC 2119, March 1997 (Referred to herein as [RFC2119]).
2. Aboba, B., Blunk, L., Vollbrecht, J., Carlson, J., and H. Levkowetz, "Extensible Authentication Protocol (EAP)," RFC 37484 June 2004 (Referred to herein as [RFC3748]).
3. Aboba, B., "Extensible Authentication Protocol (EAP) Key Management Framework", draft-ietf-eap-keying-16 (work in progress), January 2007 (Referred to herein as [I-D.ietf-eap-keying]); and [I-D.ietf-eap-keying] Aboba, B., "Extensible Authentication Protocol (EAP) Key Management Framework", draft-ietf-eap-keying-15 (work in progress), October 2006.
4. Narayanan, V. and L. Dondeti. "Problem Statement on EAP Efficient Re-authentication and Key Management", draft-vidya-eap-reauth-ps-00 (work in progress), October 2006 (Referred to herein as [I-D.vidya-eap-reauth-ps]).
5. Ohba, Y., "Channel Binding Mechanism based on Parameter Binding in Key Derivation", draft-ohba-eap-channel-binding-02 (work in progress), December 2006 (Referred to herein as [I-D.ohba-eap-channel-binding]).
6. Salowey, J. "Specification for the Derivation of Usage Specific Root Keys (USRK) from an Extended Master Session Key (EMSK)", draft-salowey-eap-emsk-deriv-01 (work in progress), June 2006 (Referred to herein as [E-D-salowey-eap-emsk-deriv])
7. National Institute of Standards and Technology, "Secure Hash Standard", August 2002 (Referred to herein as [sha256]).

8. Arkko., J. and P. Eronen, "Authenticated Service Information for the Extensible Authentication Protocol (EAP)", http://tools.ietf.org/html/draft-arkko-eap-service-identity-auth-04, October 2005 (Referred to herein as [arkko-eap-service-identity-auth]).
9. Kaufman, C., "Internet Key Exchange (IKEv2) Protocol", RFC 4306, December 2005 (Referred to herein as [RFC4306]))
10. Narayanan, V. and L. Dondeti, "EAP Re-authentication Extensions", draft-ietf-hokey-erx-02 (work in progress), July 2007 (Referred to herein as [I-D.ietf-hokey-erx]).
11. Salowey, J., "Specification for the Derivation of Root Keys from an Extended Master Session Key (EMSK)", draft-iet-hokey-emsk-hierarchy-01 (work in progress), June 2007 (Referred to herein as [I-D.ietf-hokey-emsk-hierarchy]).

While a variety of systems and methods are known, there remains a need for improved systems and methods.

SUMMARY

The present invention overcomes various limitations and deficiencies in the background art. The present application incorporates herein a plurality of inventions, including the following sets of inventions as described below.

Invention Set #1:

According to some embodiments, a process for authentication of a method between a client and a server, includes a) employing a method which has no authentication mechanism between a client and a server; and b) having the method rely on an inner authentication method in order to authenticate the client. Preferably, the method is a first EAP method having no authentication mechanism that carries a second EAP method inside, the second EAP method being used to authenticate the client.

Invention Set #2:

According to some other embodiments, a process for an EAP peer and an EAP server to negotiate on capabilities regarding an EAP extended functionality includes, employing an EAP extension method (EAP-EXT) that provides capabilities exchange between the server and the client regarding the extended functionality, wherein the extended functionality has no authentication mechanism and wherein at least one inner EAP method is run inside the EAP extension method for authenticating the EAP peer. In some embodiments, the method further includes having the inner EAP method generate keying material, and protecting messages in the outer EAP extension method with an AUTH TLV. In some embodiments, the method further includes wherein AUTH TLVs in outer EAP extension messages are computed using an EAR extension key (EAP-EXT-KEY) generated from EAP keying material of a latest successful inner method. In some embodiments, the method further includes that the EAP extension key is used for computing AUTH TLVs for integrity protecting EAP-EXT messages. In some embodiments, the method further includes that the EAP extension key is derived from an EMSK generated by an inner EAP method using a usage specific root key derivation algorithm. In some embodiments, the method further includes that the EAP extension method defines an EAP-re-authentication key that is used as a pre-shared key required by an EAP method used for a re-authentication mechanism. In some embodiments, the method further includes that the EAP re-authentication key is derived from an EMSK exported from the EAP extension method using a usage specific root key derivation algorithm. In some embodiments, the method further includes that the EAP extension method employs a message format including common EAP fields, with a bit that is configured to be set to indicate that it is the last message, with another bit that is configured to be set to indicate an error, with a version field of a plurality of bits, a reserved field of a plurality of bits for future extensions, and a capabilities field of a plurality of bits that each corresponds to a particular capability. In some embodiments, the method further includes that the capabilities exchange between the server and the client regarding the extended functionality is provided by setting of a capabilities bit. In some embodiments, the method further includes the capabilities bit indicates that the sender supports a channel binding mechanism. In some embodiments, the method further includes the capabilities bit indicates that the sender supports re-authentication. In some embodiments, the method further includes when the capabilities bit indicates that the sender supports re-authentication is set in a final Request/EXT message, and the message includes a Server-ID TLV and a Peer-ID TLV. In some embodiments, the method further includes that when the capabilities bit indicates that the send supports re-authentication is set in a final Request/EXT and Response/EXT message exchange, the EAP peer and the EAP server generate an EAP re-authentication key, and wherein the ServerI-D and the Peer-ID contained in the ServerID and the Peer-ID TLVs and the EAP re-authentication key are used for a re-authentication EAP method. In some embodiments, the method further includes employing multiple inner EAP methods that are sequentially run inside the EAP extension method, and generating a new EAP extension key each time an inner EAP method in the sequence generates keying material. In some embodiments, the method further includes a) the EAP Server transmits an EAP-Request/EXT message with at least one capability bit set; b) the EAP Peer receives the EAP-Request/Ext message and transmits an EAP-Response/EXT message with at least one capability bit set. In some embodiments, the method further includes c) the EAP Server receives the EAP-Response/Ext message and transmits an EAP-Request/EXT message with an F-bit set, at least one capability bit set, a Peer-ID TLV, a Server-ID TLV, and an AUTH TLV, d) the EAP Peer receives the EAP-Request/Ext message in c) above and transmits an EAP-Response/EXT message with an F-bit set, at least one capability bit set and an AUTH TLV; e) the EAP Server receives the EAP-Response/EXT message in d) and transmits an EAP-Success message. In some embodiments, the method further includes having either the EAP peer or the EAP server send an EAP extension message with a bit set for error indication in the even that the peer or the server detects an error and with an AUTH TLV. In some embodiments, the method further includes performing protected message exchange after creation of keying material to avoid capabilities information from being attacked by an attacker. In some embodiments, the method further includes sequencing of multiple EAP methods inside of the EAP extension method. In some embodiments, the method further includes creating a cryptographic binding by protecting each inner EAP method together with the outer EAP extension method with a key generated by its preceding successful inner method in the sequence and finally exporting EAP keying material generated by the last successful inner EAP method.

Invention Set #3:

According to some other embodiments, a wireless mobile station is provided that includes: a processor, memory, digital data storage, and at least one wireless interface for wirelessly transmitting and receiving data messages; the wireless mobile device being programmed to operate as an EAP peer, and wherein the wireless mobile device is programmed to: i) receive an EAP-Request/EXT message with at least one capability bit set from an EAP Server; and ii) transmit an EAP-Response/EXT message with at least one capability bit set.

Invention Set #4:

According to some other embodiments, an EAP server for a wireless network that terminates an EAP authentication method with an EAP peer, the LAP server being configured to: a) transmit an EAP-Request/EXT message with at least one capability bit set to an EAP Peer; and b) receive an EAP-Response/EXT message with at least one capability bit set from the LAP Peer.

The above and/or other inventions, aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which:

FIG. 1 is a diagram depicting an illustrative EAP-EXT message sequence between an EAP Server and an EAP Peer with a single inner method according to some embodiments;

FIG. 2 is a diagram depicting an illustrative EAP-EXT message sequence between an EAP Server and an EAP Peer with multiple inner methods according to some embodiments;

FIG. 4 is another diagram depicting an illustrative EAP-EXT message sequence between an EAP Server and an EAP Peer with a single inner method according to some additional embodiments;

FIG. 7(A) is a diagram that depicts an encryption-algorithm TLV; and

FIG. 7(B) is a diagram that depicts an Integrity-Algorithm TLV.

DETAILED DESCRIPTION OF THE PREFERRED EMBODIMENTS

Figure 3A:
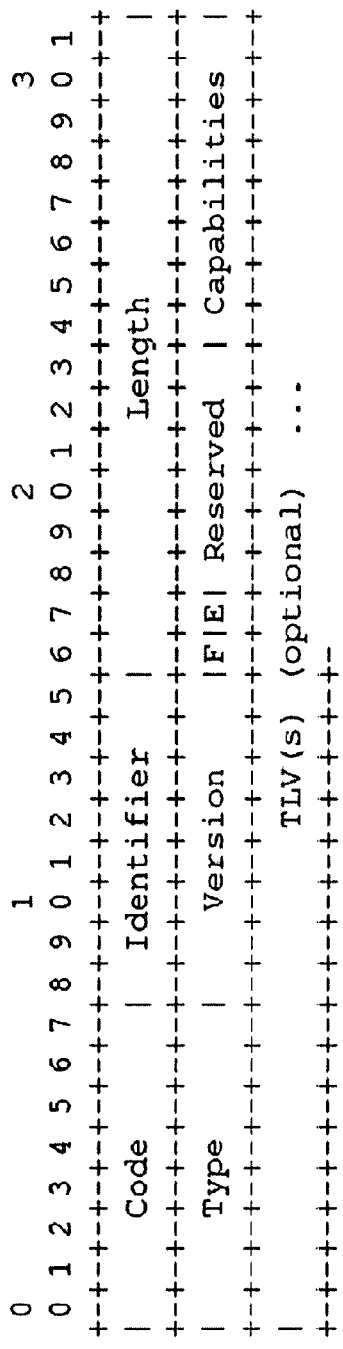
FIG. 3(A) is a diagram depicting illustrative message formats according to some exemplary embodiments.

While the present invention may be embodied in many different forms, a number of illustrative embodiments are described with the understanding that the present disclosure is to be considered as providing examples of the principles of the various inventions described herein and that such examples are not intended to limit the invention to preferred embodiments described herein and/or illustrated herein.

1. Introduction

EAP (Extensible Authentication Protocol) is an authentication protocol which supports multiple authentication algorithms known as "EAP methods" [RFC3748]. In EAP, an EAP peer and an EAP server generates EAP keying material, i.e., MSK (Master Session Key) and EMSK (Extended Master Session Key). A detailed framework for the generation, transport and usage of MSK is described in [I-D.ietf-eap-keying].

There is an extended functionality of EAP [RFC3748] by defining several usages of EMSK (Extended Master Session Key) where one of the EMSK usages is re-authentication. Another extended functionality of EAP is a channel binding scheme defined in [I-D.ohba-eap-channel-binding]. For further background reference regarding channel binding, the entire disclosure of co-pending application Ser. No. 11/379,568 entitled CHANNEL BINDING MECHANISM BASED PARAMETER BINDING IN KEY DERIVATION, filed on Apr. 20, 2006 to Y. Ohba, is incorporated herein by reference in its entirety. Since implementations that support an extended functionality of EAP need to interoperate with implementations that do not support the extended functionality such that the former implementations can disable the extended functionality when communicating with the latter implementations, a mechanism is needed for an EAP peer and an EAP server to negotiate on the capabilities with regard to the extended functionality of EAP is needed.

There are two basic approaches for extending EAP functionality. One approach is to define new EAP Codes to realize the extended EAP functionality in addition to the existing ones, i.e., Request, Response, Success and Failure. This approach, however, requires changes to RFC3748 and may also require changes to lower layer protocols. The other approach is to define a new EAP method to realize the extended functionality. This document takes the latter approach to minimize the impact on the existing EAP deployment.

This document describes EAP-EXT, an EAP method for extending EAP functionality. In some preferred embodiments, the extended EAP functionality includes channel binding and re-authentication. The EAP-EXT method also allows sequencing of multiple EAP methods inside it.

2. EAP-EXT Overview

In the preferred embodiments, EAP-EXT provides capabilities exchange. In this regard, bits within the messages can be used for indication of capability. In some embodiments, one bit (R-bit) is used for indicating Re-authentication capability. In some embodiments, one bit (C-bit) is used for indicating channel binding capability.

When EAP-EXT is used, the precedent EAP-identity exchange can be omitted if the identity of the peer is known to the server before the server sends the first EAP-Request. In this regard, there are several outband mechanisms for providing the identity of the peer to the server, e.g., transferring the identity of the peer between authenticators and servers.

In EAP-EXT, extended EAP capabilities such as, e.g., channel binding and re-authentication are exchanged between the peer and the server. At the same time, at least one EAP method (e.g. EAP-TLS) is run inside EAP-EXT for authenticating the peer. Until an inner method generates EAP keying material, no AUTH TLV is included and the capabilities are non-protected. Hence, if there is only one inner EAP method, additional EAP-EXT exchange(s) with an AUTH TLV but without an Method TLV is performed before sending an SAP-Success or an EAP-Failure message.

After an inner EAP method generates EAP keying material, EAP-EXT messages need to be protected with an AUTH TLV. AUTH TLVs in EAP-EXT messages need to be computed using EAP-EXT-KEY generated from EAP keying material of the latest successful inner method. This means that if there are multiple inner EAP methods that are sequentially run inside EAP-EXT, a new SAP-EXT-KEY is generated each time an inner EAP method in the sequence generates EAP keying material. Any inner SAP method needs to be capable of generating EAP keying material.

At the end of a successful EAP-EXT run, the EAP keying material generated by the last successful inner EAP method is exported to the EAP layer. F-bit is used for indicating the end of EXP-EXT exchange.

FIG. 1 shows an example of EAP-EXT message sequence with a single inner EAP method. FIG. 2 shows an example of EAP-EXT message sequence with multiple inner EAP methods.

3. Error Handling

An error may happen for several reasons, e.g., due to failure of inner EAP method authentication or a malformed, unknown or missing EAP-EXT TLV. An error may be detected either by the peer or by the server. An EAP-EXT message that caused an error is referred to as an erroneous message. EAP-EXT messages with E-bit set are used for error indications. These messages are referred to as error indications. An error indication needs to contain an AUTH TLV, and should not contain other TLVs.

Any erroneous message (including an erroneous error indication) without a valid AUTH TLV needs to be silently discarded.

For an erroneous Request with a valid AUTH TLV, the peer sends an error indication Response. For an erroneous Response with a valid AUTH TLV, the server sends an error indication Request which is responded by the peer with an error indication Response. The server returns an EAP-Failure message in response to an error indication Response with a valid AUTH TLV.

4. Integrity Protection Keys

EAP-EXT defines two types of keys: 1) EAP-EXT-KEY and 2) EAP-REAUTH-KEY, 4.1. EAP-EXT-KEY EAP-EXT-KEY is used for computing AUTH TLVs for integrity protecting EAP-EXT messages. When HMAC-SHA-256 (see, e.g., reference [sha256] incorporated by reference above) is used for the integrity algorithm, the length of EAP-EXT-KEY is 32-octet. An EAP-EXT-KEY is derived from the EMSK generated by an inner EAP method using the USRK (Usage Specific Root Key) derivation algorithm defined in (see, e.g., reference [I-D.salowey-eap-emsk-deriv] incorporated by reference above) as follows.

EAP-EXT-KEY KDF (EMSK, "EAP-EXT-integrity-Key", length).

In KDF, EAP-EXT-KEY uses the default PRF specified in reference [I-D-salowey-eap-emsk-deriv] incorporated by reference above.

4.2. EAP-REAUTH-KEY

EAP-REAUTH-KEY is used as the pre-shared key required by an EAP method used for a re-authentication mechanism. The length of EAP-REAUTH-KEY depends on the re-authentication mechanism. The EAP-REAUTH-KEY is derived from the EMSK exported from EAP-EXT using the USRK derivation algorithm defined in reference [I-D.salowey-eap-emsk-deriv] incorporated above as follows.

EAP-REAUTH-KEY=KDF(EMSK, "EAP-EXT-Reauthentication-Key", length).

5. Message Format

EAP-EXT uses EAP Type X (To be assigned by IANA). The message format including the common EAP fields (e.g., Code, Identifier, Length and Type) defined in [RFC3748] is shown in FIG. 3(A).

F:

This bit needs to be set to indicate that this is the last EAP-EXT message from the sender. Otherwise, this bit needs to not be set.

This bit is set when the message is an error indication. When this bit is set, F-bit needs to also be set. See Section 3 for detailed description on error indications.

Version:

This 8-bit field indicates the version of the EAP-EXT method. This document defines Version 1.

Reserved;

This 6-bit field is reserved for future extensions. This field needs to be set to zero by the sender and the recipient needs to ignore this field.

Figure 3B:
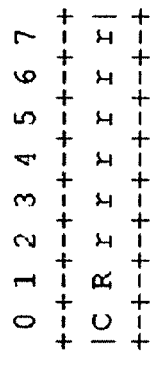
FIG. 3(B) is a diagram depicting an illustrative capabilities field according to some exemplary embodiments.

Capabilities:

This field The Capabilities field contains extended EAP capabilities. The Capabilities field the format shown in FIG. 3(B).

Each bit corresponds to a particular capability. The semantics of each bit is as follows.

C:

This bit is set to indicate that the sender supports the channel binding mechanism defined in [I-D.ohba-eap-channel-binding] for MSK. When this bit is set for both Requests and Responses and the EAP-EXT method completes with success, the peer and the server needs to enable channel binding mechanism. The default hash algorithm for prf+ is AUTH_H-MAC_SHA1__160.

R:

This bit is set to indicate that the sender supports a re-authentication EAP method. When this bit is set in the final Request/EXT message (i.e., the Request/EXT with F-bit is set), the message needs to include a Server-ID TLV and a Peer-ID TLV and can include a Reauth-Key-Lifetime AVP. When this bit is set in the final Request/EXT and Response/EXT exchanges, the peer and the server needs to generate an EAP-REAUTH-KEY. The Server-ID and Peer-ID contained in the Server-ID and Peer-ID TLVs and the EAP-REAUTH-KEY is used for a re-authentication EAP method. A default re-authentication mechanism can be selected by those in the art based on this disclosure.

Other bits are reserved for future use, and needs to be set to zero by the sender and needs to be ignored by the recipient.

Figure 3C:
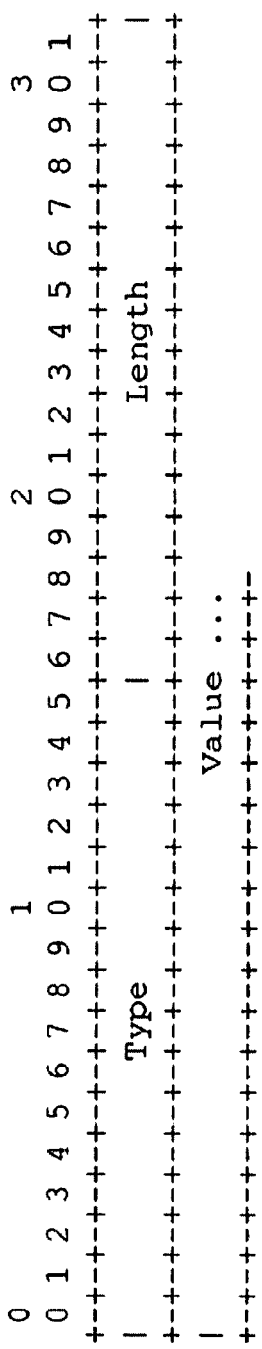
FIG. 3(C) is a diagram depicting an illustrative TLV format according to some exemplary embodiments.

TLV:

Zero, one or more TLVs (Type-Length-Value's). The TLV format of is shown in FIG. 3(C).

Type:

This field indicates the type of this TLV.

Length:

This field indicates the length of this TLV in octets, including the Type and Length fields of the TLV.

Value:

This field contains data specific to the TLV Type.

6. EAP-EXT TLVs

The following TLVs are defined.

6.1. Method TLV

The Method TLV (Type 1) contains an EAP Method payload starting from Type field.

6.2. AUTH TLV

The AUTH TLV (Type 2) contains integrity data used for protecting EAP-EXT messages. The EAP-EXT-KEY is used for computing AUTH TLVs.

The TLV-Value field is computed over the entire EAP message including this field. Before computing the integrity data, this field needs to be initialized to all zeros. The length of this field depends on the integrity algorithm in use. Men the integrity check fails, the message needs to be silently discarded. The default integrity algorithm is HMAC-SHA-256 (see, e.g., reference [sha256] incorporated above), 6.3. Peer-ID TLV The Peer-ID TLV (Type 3) contains the identity of the peer used for re-authentication.

6.4. Server-ID TLV

The Server-ID TLV (Type 4) contains the identity of the server used for re-authentication.

6.5 Reauth-Key-Lifetime TLV

The Reauth-Key-Lifetime TLV (Type 5) contains the lifetime of EAP-REAUTH-KEY in seconds, 7. Security Considerations Capability exchange before an inner EAP method exports EAP keying material is unprotected. Hence, additional protected message exchange after creation of EAP keying material is mandated to avoid the capabilities information to be altered by an attacker without being detected by the peer and the server.

EAP-EXT allows sequencing of multiple EAP methods inside it. It is known that a compound authentication method that consists of multiple nested or sequential authentication methods without cryptographically binding them has a vulnerability to man-in-the-middle attack. EAP-EXT is able to create the required cryptographically binding by protecting each inner EAP method together with the outer EAP method (i.e., EAP-EXT) with a key generated by its precedent successful inner method in the sequence and finally exporting EAP keying material generated by the last successful inner EAP method. In order to achieve cryptographic binding, EAP-EXT requires inner EAP methods to be capable of generating EAP keying material.

Additional EAP-EXT Embodiments

The remainder of this detailed description describes additional EAP-EXT embodiments having some modifications over the above original embodiments in some contexts. As will be appreciated, these additional embodiments are parallel in many respects to the foregoing embodiments described above. In these additional embodiments, extended functionality, such as, e.g., as HOKEY re-authentication (see, e.g., [I-D.ietf-hokey-erx]) and MSK channel binding [I-D.ietf-eap-keying] can be supported by extending EAP functionality. As explained above, there can be two approaches for extending EAP functionality. One approach is to define new EAP Codes to realize the extended EAP functionality in addition to the existing ones, i.e., Request, Response, Success and Failure. This approach, however, requires changes to [RFC3748] and may also require changes to authenticators and lower layer protocols. The other approach is to define a new EAP method to realize the extended functionality. For both approaches, it may be desirable that these extended functionalities are backward compatible. In such cases, a mechanism for negotiating the capabilities on the extended functionalities between an EAP peer and an EAP server may be needed.

In these additional embodiments, an EAP method is described that is used for extending EAP functionality. The extended functionality includes, e.g., HOKEY re-authentication and MSK channel binding. The proposed EAP method (EAP-EXT) in these embodiments again also allows sequencing of multiple EAP methods within itself. In addition, in these embodiments, EAR-EXT can generate MSK and EMSK in cases where inner method(s) implementations generate MSK but do not generate EMSK.

EAP-EXT Overview:

EAP-EXT provides capabilities exchange. One bit (R-bit) is used for indicating HOKEY re-authentication capability. One bit (C-bit) is used for indicating channel binding capability.

When EAP-EXT is used, the precedent EAP-Identity exchange can be omitted if the identity of the peer is known to the server before the server sends the first EAP-Request. Out of band mechanisms for providing the identity of the peer may be used e.g., transferring the identity of the peer between authenticators and servers.

In EAP-EXT, extended EAP capabilities such as HOKEY re-authentication and MSK channel binding are exchanged between the peer and the server. At the same time, at least one EAP method (e.g., EAP-TLS) is run inside EAP-EXT for authenticating the peer. Inner method(s) are carried in Method TLVs (Type-Length-Values). Until an inner method generates EAP keying material, no AUTH TLV is included and the capabilities are non-protected. Hence, if there is only one inner EAP method, additional EAP-EXT exchange(s) with an AUTH TLV need(s) to be performed after completion of the inner method and before sending an EAP-Success or an EAP-Failure message.

After an inner EAP method generates EAP keying material, EAP-EXT messages needs to be protected with an AUTH TLV. AUTH TLVs in EAP-EXT messages needs to be computed using EAP-EXT-AUTH-KEY generated from EAP keying material of the latest successful inner method. This means that if there are multiple inner EAP methods that are sequentially run inside EAP-EXT, a new EAP-EXT-AUTH-KEY is generated each time an inner EAP method in the sequence generates EAP keying material. Any inner EAP method needs to be capable of generating EAP keying material.

At the end of a successful EAP-EXT run. EAP keying material is derived from the MSK generated by the last successful inner EAP method and is exported to the EAP layer. The pseudo random function used for deriving the EAP keying material and USRKs (Usage Specific Root Keys) [I-D.i-etf-hokey-emsk-hierarchy] can be negotiated within EAP-EXT using PRF TLVs. F-bit is used for indicating the end of EXP-EXT exchange.

Figure 5:
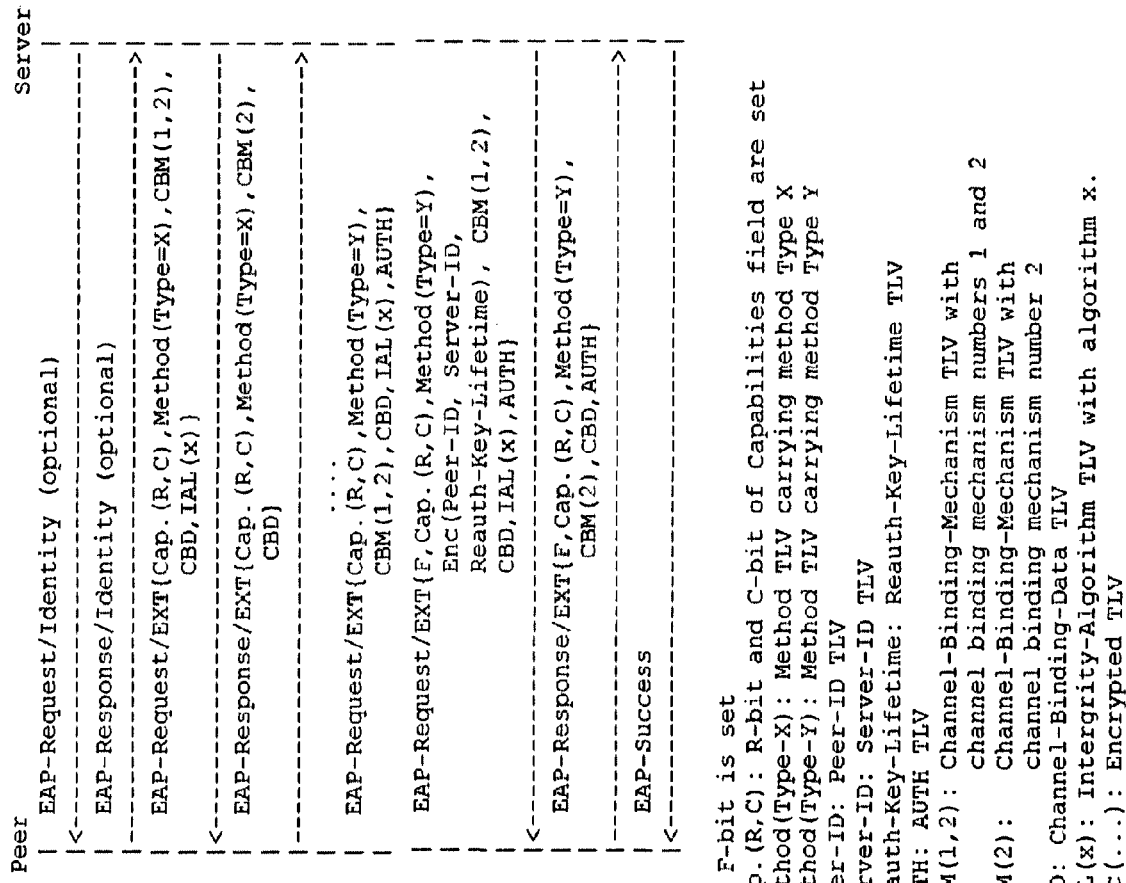
FIG. 5 is a diagram depicting an illustrative EAP-EXT message sequence between an EAP Server and an EAP Peer with multiple inner methods according to some additional embodiments.

FIG. 4 shows an example of EAP-EXT message sequence with a single inner EAP method and with PRF negotiation. FIG. 5 shows an example of EAP-EXT message sequence with multiple inner EAP methods and without PRF negotiation.

Error Handling:

The discussion regarding error handling in the original embodiments described above is incorporated herein.

Keys:

In some embodiments, EAP-EXT defines the following types of keys.

a. MSK and EMSK Exported from EAP-EXT:

A set of 64-octet MSK and 64-octet EMSK to be exported from EAP-EXT is derived from MSK_i, the MSK generated by the last successful inner EAP method, using the KDF defined in [I-D.ietf-hokey-emsk-hierarchy] in the following way.

(MSK, EMSK)=KDF(MSK_i, "EAP-EXT-EAP-Keying-Material", 128)

b. EAP-EXT-AUTH-KEY:

EAP-EXT-AUTH-KEY is used for computing AUTH TLVs for integrity protecting EAP-EXT messages. EAP-EXT-AUTH-KEY is used within EAP-EXT only and is never exported. The EAP-EXT-AUTH-KEY is derived from the MSK generated by the last successful inner EAP method (MSK_i), using the prf+defined in [RFC4306] in the following way.

EAP-EXT-AUTH-KEY=prf+(MSK_i, "EAP-EXT-Authentication-Key",length);

The default hash algorithm for prf+ is PRE_HMAC_SHA2_256.

The field length will depend upon the integrity algorithm selected by the EAP Server during the EAP-EXT exchange. When HMAC-SHA-256 [sha256] is used for the integrity algorithm, length=32.

c. EAP-EXT-ENC-KEY:

EAP-EXT-ENC-KEY is used for ciphering the content of Encrypted TLVs. It is derived from MSK_i, the MSK generated by the last successful inner EAP method, using the KDF defined in [I-D.ietf-hokey-emsk-hierarchy] in the following way.

EAP-EXT-ENC-KEY=pr f+(MSK_i, "EAP-EXT-Encryption-Key", length).

The PRF used to generate EAP-EXT-ENC-KEY is determined by the integrity algorithm selected by the EAR server during the EAP-EXT exchange. The default hash algorithm for prf+ is PRF_HMAC_SHA2_256.

The field length will depend upon the negotiated encryption algorithm negotiated during EAP-EXT exchange. For example, when AES-CBC-128 is used, length=16.

d. HOKEY-REAUTH-KEY:

HOKEY-REAUTH-KEY is used as the pre-shared key required for the HOKEY re-authentication mechanism [I-D.ietf-hokey-erx]. The length of HOKEY-REAUTH-KEY depends on the HOKEY re-authentication mechanism. The HOKEY-REAUTH-KEY is derived from the EMSK exported from EAP-EXT using the USRK derivation algorithm defined in [I-D.ietf-hokey-emsk-hierarchy] as follows.

HOKEY-REAUTH-KEY—KDF(EMSK, "EAP-IET-Re-authentication-Key" length).

Figure 6A:
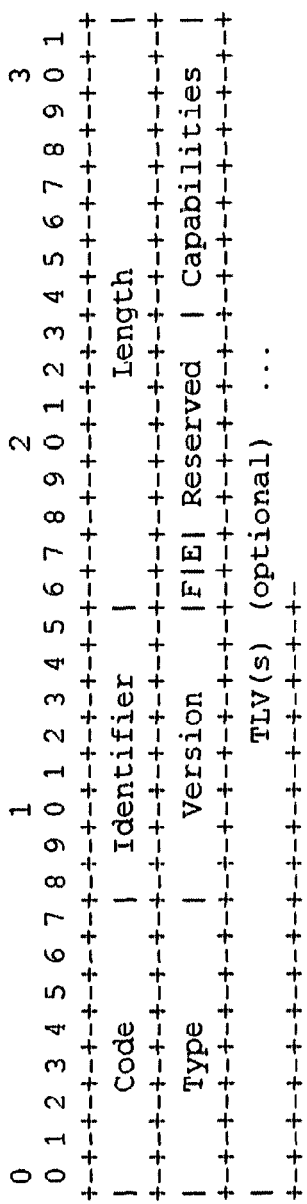
FIG. 6(A) is a diagram depicting illustrative message formats according to some additional exemplary embodiments.

Message Format:

EAP-EXT uses EAP Type XX (To be assigned by IANA). The message format including the common EAP fields (i.e., Code, Identifier, Length and Type) defined in [RFC3748] is shown in FIG. 6(A).

F:

This bit needs to be set to indicate that this is the last EAP-EXT message from the sender. Otherwise, this bit needs to NOT be set.

E:

This bit is set when the message is an error indication. When this bit is set, F-bit needs to also be set. See below for detailed description on error indications.

Version:

This 8-bit field indicates the version of the EAP-EXT method. This document defines Version 1.

Reserved:

This 6-bit field is reserved for future extensions. This field needs to be set to zero by the sender and the recipient needs to ignore this field.

Capabilities.

Figure 6B:
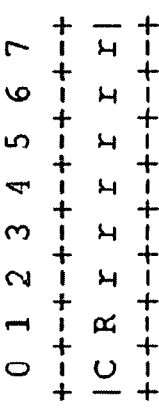
FIG. 6(B) is a diagram depicting an illustrative capabilities field according to some additional exemplary embodiments.

The Capabilities field contains extended EAP capabilities. The Capabilities field has the format as shown in FIG. 6(B) in some embodiments (which is similar to FIG. 3(B)). Here, each bit corresponds to a particular capability. The semantics of each bit is as follows.

R:

This bit is set to indicate that the sender supports HOKEY re-authentication [I-D.ietf-hokey-erx]. When this bit is set in the final Request/EXT message (i.e., the Request/EXT with F lit is set), the message needs to include a Server-ID TLV and a Peer-ID TLV and can include a Reauth-Key-Lifetime AVP. If this bit is set in the final Request/EXT and Response/EXT exchange, the peer and the server needs to generate an HOKEY-REAUTH-KEY. The Server-ID and Peer-ID contained in the Server-ID and Peer-ID TLVs and the HOKEY-REAUTH-KEY is used for HOKEY re-authentication.

C:

This bit is set to indicate that the sender supports a channel binding mechanism for MSK. When this bit is set in a Request/EXT message, one Channel-Binding-Mechanism TLV needs to also be included to indicate the channel binding mechanism(s) supported by the server. If the peer supports and wants to enable one of the channel binding mechanism(s) supported by the server, it sends a Response/EXT message with this bit set and one Channel-Binding-Mechanism TLV containing the selected channel binding mechanism. If this bit is set in the final Request/EXT and Response/EXT exchange with successful negotiation of one channel binding mechanism and the EAP-EXT method completes with success, the peer and the server needs to enable the negotiated channel binding mechanism.

Other bits are reserved for future use, and needs to be set to zero by the sender and needs to be ignored by the recipient.

Figure 6C:
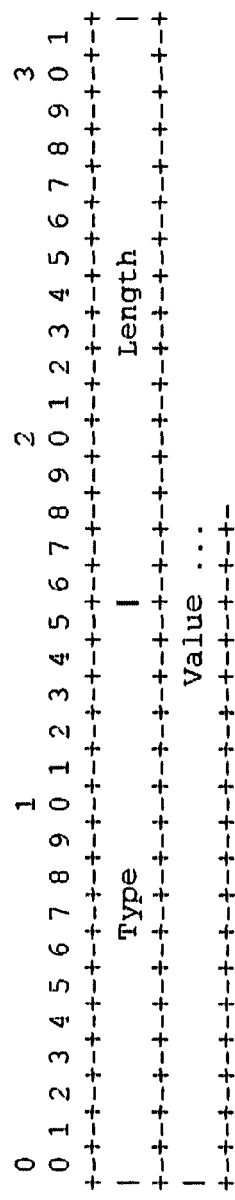
FIG. 6(C) is a diagram depicting an illustrative TLV format according to some additional exemplary embodiments.

TLV:

Zero, one or more TLVs (Type-Length-Value's). The TLV format of is as shown in FIG. 6(C) (which is similar to the embodiment shown in FIG. 3(C)).

Type:

This field indicates the type of this TLV.

Length:

This field indicates the length of this TLV in octets, including the Type and Length fields of the TLV.

Value:

This field contains data specific to the TLV Type.

EAP-EXT TLVs:

In these embodiments, the following TLVs are defined.

a. Method TLV

The Method TLV (Type 1) contains an EAP Method payload starting from Type field.

b. AUTH TLV

The AUTH TLV (Type 2) contains integrity data used for protecting EAP-EXT messages. The EAP-EXT-AUTH-KEY is used for computing AUTH TLVs. The TLV-Value field is computed over the entire EAP message including this field. Before computing the integrity data, this field needs to be initialized to all zeros. The length of this field depends on the integrity algorithm in use. When the integrity check fails, the message needs to be silently discarded. The default integrity algorithm is HMAC-SHA-256 [sha256].

c. Peer-ID TLV

The Peer-ID TLV (Type 3) contains the identity of the peer used for HOKEY re-authentication.

d. Server-ID TLV

The Server-ID TLV (Type 4) contains the identity of the server used for HOKEY re-authentication.

e. Reauth-Key-Lifetime TLV

The Reauth-Key-Lifetime TLV (Type 5) contains the lifetime of HOKEY-REAUTH-KEY in seconds.

f. PRF TLV

The PRF TLV (Type 6) contains one or more one-octet PRF numbers defined in [I-D.ietf-hokey-emsk-hierarchy]. When this TLV is carried in a Request, it indicates the PRF number(s) supported by the server.

When this TLV is carried in a Request/EXT message, the corresponding Response/EXT message can contain this TLV, A PRF TLV in a Response/EXT message needs to contain exactly one PRF number that is supported and selected by the peer among the PRF numbers in the Request/EXT message. If the PRF number is successfully negotiated using the PRF TLV exchange described above, the negotiated PRF number is used for KDF to derive EAP keying material to be exported by EAP-EXT and USRKs. Otherwise, the default PRF specified in [I-D.ietf-hokey-emsk-hierarchy] is used for KDF.

g. Channel-Binding-Mechanism TLV

The Channel-Binding-Mechanism TLV (Type 7) contains one or more one-octet channel binding mechanism numbers. When this TLV is carried in a Request/EXT message, it indicates the channel binding mechanism number(s) supported by the server. When this TLV is carried in a Request/EXT message, the corresponding Response/EXT message can contain this TLV. A Channel-Binding-Mechanism TLV in a Response/EXT message needs to contain exactly one channel binding mechanism number that is supported and selected by the peer among the channel binding mechanism numbers in the Request/EXT message. If the channel binding mechanism is successfully negotiated using the Channel-Binding-Mechanism TLV exchange described above, the negotiated channel binding mechanism is enabled.

The following channel binding mechanism numbers are defined in this document: Mechanism 1—[I-D.ohba-eap-channel-binding]; and Mechanism 2—[arkko-eap-service-identity-auth].

For channel binding mechanism 1; the default hash algorithm for prf+ is PRF_HMAC_SHA2_256.

For channel binding mechanism 2 an additional Channel-Binding-Data TLV is carried in Requests and Responses.

h. Channel-Binding-Data TLV

The Channel-Binding-Data TLV (Type 8) contains octet string data used for [arkko-eap-service-identity-auth].

i. Encryption-Algorithm TLV

The Encryption-Algorithm TLV allows negotiation of encryption algorithms used for ciphering Encrypted TLVs When this TLV is carried in a Request/EXT, it indicates the cryptographic algorithms supported by the EAP server. When this TLV is carried in a Request/EXT message, the corresponding Response/EXT message can contain this TLV. An Encryption-Algorithm TLV in a Response/EXT message needs to contain exactly one encryption algorithm number supported and selected by the peer among the options in the Encryption-Algorithm TLV contained in the Request/EXT message. Note that the EAP Server can force the EAP Peer to use the default encryption algorithm (AES-CBC-128). In such a case, the EAP peer does not include the Encryption-Algorithm TLV in the Request/EXT message and, in the same way, the EAP peer does not include it in the Response/EXT either. For reference, FIG. 7(A) depicts an encryption-algorithm TLV.

It contains one or more one-octet numbers defined in the following list:

| 0 | Reserved |
| 1 | AES-CBC-128 (default) |
| 2 | AES-CBC-256 |
| 3 | 3DES |
| 4 | IDEA |

Note that if the algorithms are not successfully negotiated using the Encryption-Algorithm TLV, the default encryption algorithm is used instead.

j. Integrity-Algorithm TLV

The EAP-EXT method does not allow integrity algorithm negotiation for simplicity and in order to avoid bidding-down attacks. However, the EAP server can select from different integrity algorithms and inform the EAP peer about this selection through the Integrity-Algorithm TLV. If the EAP server does not include this TLV the default value is HMAC-SHA-256. For reference, FIG. 7(B) depicts an Integrity-Algorithm TLV.

It contains one or more one-octet numbers defined in the following list:

| 0 | Reserved |
| 1 | HMAC-SHA-1 |
| 2 | HMAC-SHA-224 |
| 3 | HMAC-SHA-256 (default) |
| 4 | HMAC-SHA-384 |
| 5 | HMAC-SHA-512 | k. Encrypted TLV

The Encrypted TLV (Type 10) contains one or more plaintext TLVs encrypted with EAP-EXT-ENC-KEY. The length of this field depends on the encryption algorithm in use. Reference is made to FIG. 7(C).

It contains one or more one-octet numbers defined in the following.

Type:
(10) Encrypted TLV
Length:
4+IV Length+Encrypted Data Length.
IV:
The IV is an Octet string of random bits, most significant bit first. The length of IV depends on the encryption algorithm in use. For example for AES-CBC-128 the IV is 16 bytes (128 bits).
Encrypted Data:
Encrypted TLV of variable length. The encrypted data consists of one or more plaintext TLVs ciphered with EAP-EET-ENC-KEY. Note that depending on the encryption algorithm and the length of plaintext data, padding data may be added to the plaintext data before the ciphering operation.

Security Considerations:

Capability exchange before an inner EAP method exports EAP keying material is unprotected. Hence, additional protected message exchange after creation of EAP keying material is mandated to avoid the capabilities information to be altered by an attacker without being detected by the peer and the server.

EAP-EXT allows sequencing of multiple EAP methods inside it. It is known that a compound authentication method that consists of multiple nested or sequential authentication methods without cryptographically binding them has a vulnerability to man-in-the-middle attack. EAP-EXT is able to create the required cryptographically binding by protecting each inner EAP method together with the outer EAP method (i.e., EAP-EXT) with a key generated by its precedent successful inner method in the sequence and finally exporting EAP keying material derived from that is generated by the last successful inner EAP method. In order to achieve cryptographic binding, EAP-EXT requires inner EAP methods to be capable of generating EAP keying material.

This method exports MSK and EMSK that are computed from MSK of an inner method. Therefore, the strength of exported MSK and EMSK altogether is the same as that of the MSK of the inner method.

Broad Scope of the Invention:

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A process for authentication of a method between a client and a server, comprising:
    a) employing a method which has no authentication mechanism between a client and a server;
    b) performing a capabilities exchange between the client and the server regarding employing an extended EAP functionality;
    c) upon confirmation of the client and the server's extended EAP functionality capability having said method rely on an inner authentication method in order to authenticate the client;
    d) wherein said method is a first EAP method having no authentication mechanism that carries a second EAP method inside, said second EAP method being used to authenticate the client;
    e) creating a cryptographic binding between said first and second EAP methods by deriving EAP keying material for said first EAP method based on EAP keying material generated by said second EAP method, and
    f) wherein the process includes employing multiple inner EAP methods that are sequentially run inside the EAP extension method and generating a new EAP extension key each time an inner EAP method in the sequence generates keying material.

2. The process of claim 1, wherein said deriving EAP keying material includes applying a pseudo random function or derivation algorithm on the EAP keying material generated by said at least one inner EAP method.

3. A process for an EAP peer and an EAP server to negotiate on capabilities regarding an EAP extended functionality, comprising:
    employing an EAP extension method (EAP-EXT) that provides capabilities exchange between a server and a client regarding the extended functionality,
    wherein the extended functionality has no authentication mechanism and wherein at least one inner EAP method is run inside said EAP extension method for authenticating the EAP peer,
    wherein a cryptographic binding is created between said at least one inner EAP method and said EAP extension method by deriving EAP keying material for said EAP extension method based on EAP keying material generated by said at least one inner EAP method, and
    wherein the process includes employing multiple inner EAP methods that are sequentially run inside the EAP extension method and generating a new EAP extension key each time an inner EAP method in the sequence generates keying material.

4. The process of claim 3, further including having said inner EAP method generate keying material, and protecting messages in said outer EAP extension method with an AUTH TLV.

5. The process of claim 3, wherein said EAP extension method defines an EAP-re-authentication key that is used as a pre-shared key required by an EAP method used for a re-authentication mechanism.

6. The process of claim 5, wherein said EAP re-authentication key is derived from an EMSK exported from the EAP extension method using a usage specific root key derivation algorithm.

7. The process of claim 3, wherein said EAP extension method employs a message format including common EAP fields, with a bit that is configured to be set to indicate that it is the last message, with another bit that is configured to be set to indicate an error, with a version field of a plurality of bits, a reserved field of a plurality of bits for future extensions, and a capabilities field of a plurality of bits that each corresponds to a particular capability.

8. The process of claim 3, further including that said capabilities exchange between the server and the client regarding the extended functionality is provided by setting of a capabilities bit.

9. The process of claim 8, wherein said capabilities bit indicates that a sender supports a channel binding mechanism.

10. The process of claim 8, wherein said capabilities bit indicates that a sender supports re-authentication.

11. The process of claim 10, wherein when the capabilities bit indicates that a sender supports re-authentication is set in a final Request/EXT message, and the final Request/EXT message includes a Server-ID TLV and a Peer-ID TLV.

12. The process of claim 11, wherein when the capabilities bit indicates that the sender supports re-authentication is set in a final Request/EXT and Response/EXT message exchange, the EAP peer and the EAP server generate an EAP re-authentication key, and wherein the Server-ID and the Peer-ID contained in the Server-ID and the Peer-ID TLVs and the EAP re-authentication key are used for a re-authentication EAP method.

13. The process of claim 3, wherein said process includes:
    a) said EAP Server transmits an EAP-Request/EXT message with at least one capability bit set;

b) said EAP Peer receives said EAP-Request/Ext message and transmits an EAP-Response/EXT message with at least one capability bit set.

14. The process of claim 13, wherein said process includes c) said EAP Server receives said EAP-Response/Ext message and transmits an EAP-Request/EXT message with an F-bit set, at least one capability bit set, a Peer-ID TLV, a Server-ID TLV, and an AUTH TLV;

d) said EAP Peer receives said EAP-Request/Ext message in c) above and transmits an EAP-Response/EXT message with an F-bit set, at least one capability bit set and an AUTH TLV;

e) said EAP Server receives said EAP-Response/EXT message in d) and transmits an EAP-Success message.

15. The process of claim 3, further including having either said EAP peer or said EAP server send an EAP extension message with a bit set for error indication in the event that said peer or said server detects an error and with an AUTH TLV.

16. The process of claim 3, wherein said deriving EAP keying material includes applying a pseudo random function or derivation algorithm on the EAP keying material generated by said at least one inner EAP method.

17. A process for an EAP peer and an EAP server to negotiate on capabilities regarding an EAP extended functionality, comprising:

employing an EAP extension method (EAP-EXT) that provides capabilities exchange between a server and a client regarding the extended functionality, wherein the extended functionality has no authentication mechanism and wherein at least one inner EAP method is run inside said EAP extension method for authenticating the EAP peer;

further including having said inner EAP method generate keying material, and protecting messages in said outer EAP extension method with an AUTH TLV;

wherein AUTH TLVs in outer EAP extension messages are computed using an EAP extension key (EAP-EXT-KEY) generated from EAP keying material of a latest successful inner method;

wherein the process includes employing multiple inner EAP methods that are sequentially run inside the EAP extension method and generating a new EAP extension key each time an inner EAP method in the sequence generates keying material.

18. The process of claim 17, wherein said EAP extension key is used for computing AUTH TLVs for integrity protecting EAP-EXT messages.

19. The process of claim 18, wherein said EAP extension key is derived from an EMSK generated by an inner EAP method using a usage specific root key derivation algorithm.

20. The process of claim 17, further including employing multiple inner EAP methods that are sequentially run inside the EAP extension method, and generating a new EAP extension key each time an inner EAP method in the sequence generates keying material.

21. A process for an EAP peer and an EAP server to negotiate on capabilities regarding an EAP extended functionality, comprising:

employing an EAP extension method (EAP-EXT) that provides capabilities exchange between the server and the client regarding the extended functionality, wherein the extended functionality has no authentication mechanism and wherein at least one inner EAP method is run inside said EAP extension method for authenticating the EAP peer;

further including performing protected message exchange after creation of keying material to avoid capabilities information from being attacked by an attacker;

further including sequencing of multiple EAP methods inside of the EAP extension method;

further including creating a cryptographic binding by protecting each inner EAP method together with the outer EAP extension method with a key generated by its preceding successful inner method in the sequence and finally exporting EAP keying material generated by the last successful inner EAP method;

wherein the process includes employing multiple inner EAP methods that are sequentially run inside the EAP extension method and generating a new EAP extension key each time an inner EAP method in the sequence generates keying material.

* * * * *